United States Patent
Jung et al.

(10) Patent No.: US 9,955,112 B2
(45) Date of Patent: Apr. 24, 2018

(54) DIGITAL-IMAGE TRANSMISSION APPARATUS WHICH PERFORMS COMMUNICATION, SELF-DIAGNOSIS, AND CONTROL

(71) Applicant: OPTICS CO., LTD., Gyeonggi-do (KR)

(72) Inventors: Won Seok Jung, Gyeonggi-do (KR); Jae Chul Ko, Gyeonggi-do (KR); Doo Soo Ha, Gyeonggi-do (KR); Yoo Sung Tak, Gyeonggi-do (KR)

(73) Assignee: OPTICS CO, LTD., Gyeonggi-do (KR)

( * ) Notice: Subject to any disclaimer, the term of this patent is extended or adjusted under 35 U.S.C. 154(b) by 244 days.

(21) Appl. No.: 14/889,790

(22) PCT Filed: Jul. 8, 2014

(86) PCT No.: PCT/KR2014/006083
§ 371 (c)(1),
(2) Date: Nov. 6, 2015

(87) PCT Pub. No.: WO2015/056866
PCT Pub. Date: Apr. 23, 2015

(65) Prior Publication Data
US 2016/0119577 A1    Apr. 28, 2016

(30) Foreign Application Priority Data
Oct. 15, 2013 (KR) .................. 10-2013-0122945

(51) Int. Cl.
*H04N 5/38*    (2006.01)
*H04N 5/46*    (2006.01)
(Continued)

(52) U.S. Cl.
CPC ....... *H04N 7/0125* (2013.01); *H04L 43/0817* (2013.01); *H04N 5/38* (2013.01); *H04N 5/46* (2013.01); *H04N 21/43635* (2013.01)

(58) Field of Classification Search
CPC .......... H04N 7/0125; H04N 5/38; H04N 5/46; H04N 21/43635; H04L 43/0817
See application file for complete search history.

(56) References Cited

U.S. PATENT DOCUMENTS

2007/0058976 A1* 3/2007 Tatum .................. G02B 6/4201
398/99
2010/0165189 A1* 7/2010 Bae ........................ G09G 5/006
348/441
(Continued)

FOREIGN PATENT DOCUMENTS

JP    2010-074492 A    4/2010
JP       4578081 B2    11/2010
(Continued)

OTHER PUBLICATIONS

European Extended Search Report dated Mar. 14, 2017 of the European Patent Application No. 14853574.3.
(Continued)

*Primary Examiner* — Tim T Vo
*Assistant Examiner* — Harry Wang
(74) *Attorney, Agent, or Firm* — Nixon Peabody LLP; Jeffrey L. Costellia

(57) ABSTRACT

Provided is a digital-image transmission apparatus including a transmitting unit connected to a host device and a receiving unit connected to a display device. The transmitting unit includes a host-side additional-communication control unit that controls additional communication for digital image transmission. The host-side additional-5 communication control unit performs communication with an external device to diagnose an operation state of the transmitting unit,
(Continued)

transmit a diagnosis result to the external device, and control an operation of the transmitting unit.

2 Claims, 9 Drawing Sheets

(51) Int. Cl.
*H04N 7/01* (2006.01)
*H04L 12/26* (2006.01)
*H04N 21/4363* (2011.01)

(56) References Cited

U.S. PATENT DOCUMENTS

| | | | |
|---|---|---|---|
| 2012/0167126 A1* | 6/2012 | Paek | H04N 21/42207 725/14 |
| 2013/0191563 A1 | 7/2013 | Toba et al. | |

FOREIGN PATENT DOCUMENTS

| | | |
|---|---|---|
| JP | 2012-054747 A | 3/2012 |
| JP | 2012-191283 A | 10/2012 |
| KR | 10-2000-0055189 A | 9/2000 |
| KR | 10-2002-0063523 A | 8/2002 |
| KR | 10-2004-0025994 A | 3/2004 |
| KR | 10-2009-0082668 A | 7/2009 |
| KR | 20-2011-0005489 U | 6/2011 |
| KR | 10-2012-0083947 A | 7/2012 |
| KR | 10-2013-0044389 A | 5/2013 |

OTHER PUBLICATIONS

Notice of Allowance for Korean Application No. 10-2013-0122945, dated Feb. 27, 2015.
International Search Report for International Application No. PCT/KR2014/006083, dated Oct. 2, 2014.
Written Opinion for International Application No. PCT/KR2014/006083, dated Oct. 2, 2014.
Office Action dated Nov. 15, 2016 of the Japanese Patent Application No. 2016-508914.

* cited by examiner

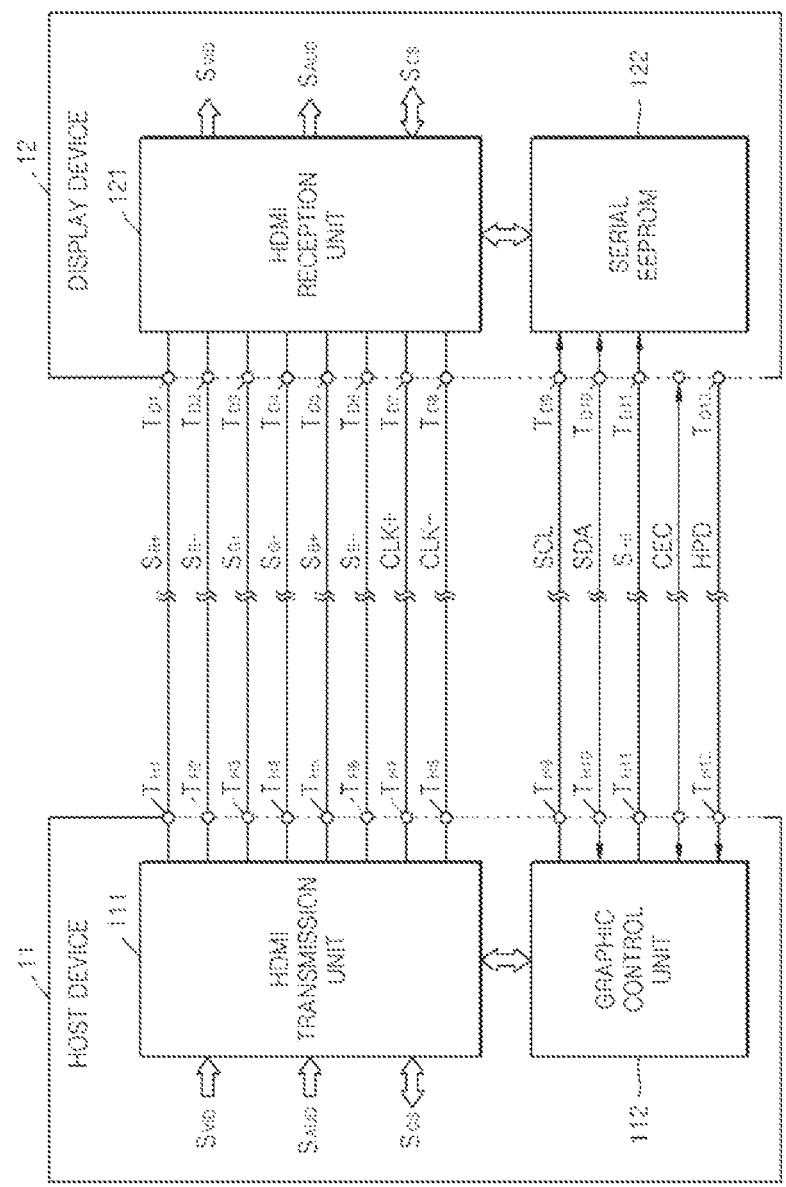
[Fig. 1]

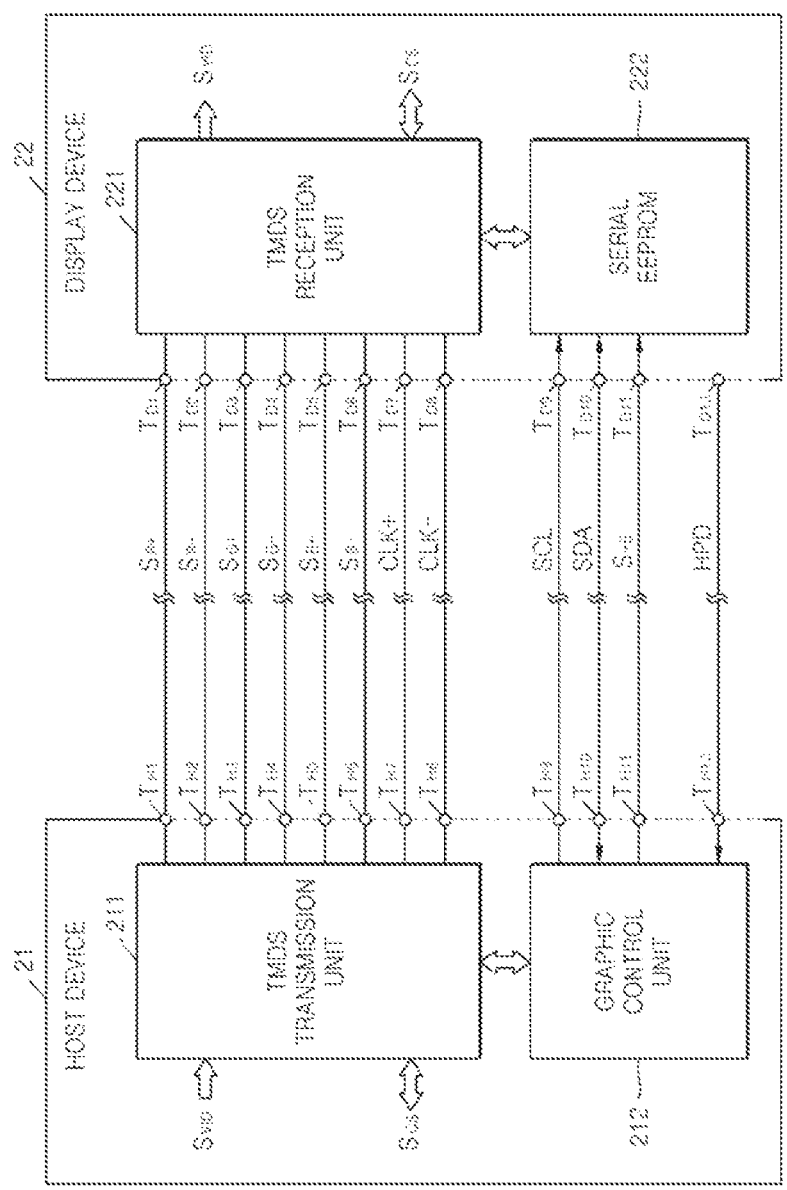
[Fig. 2]

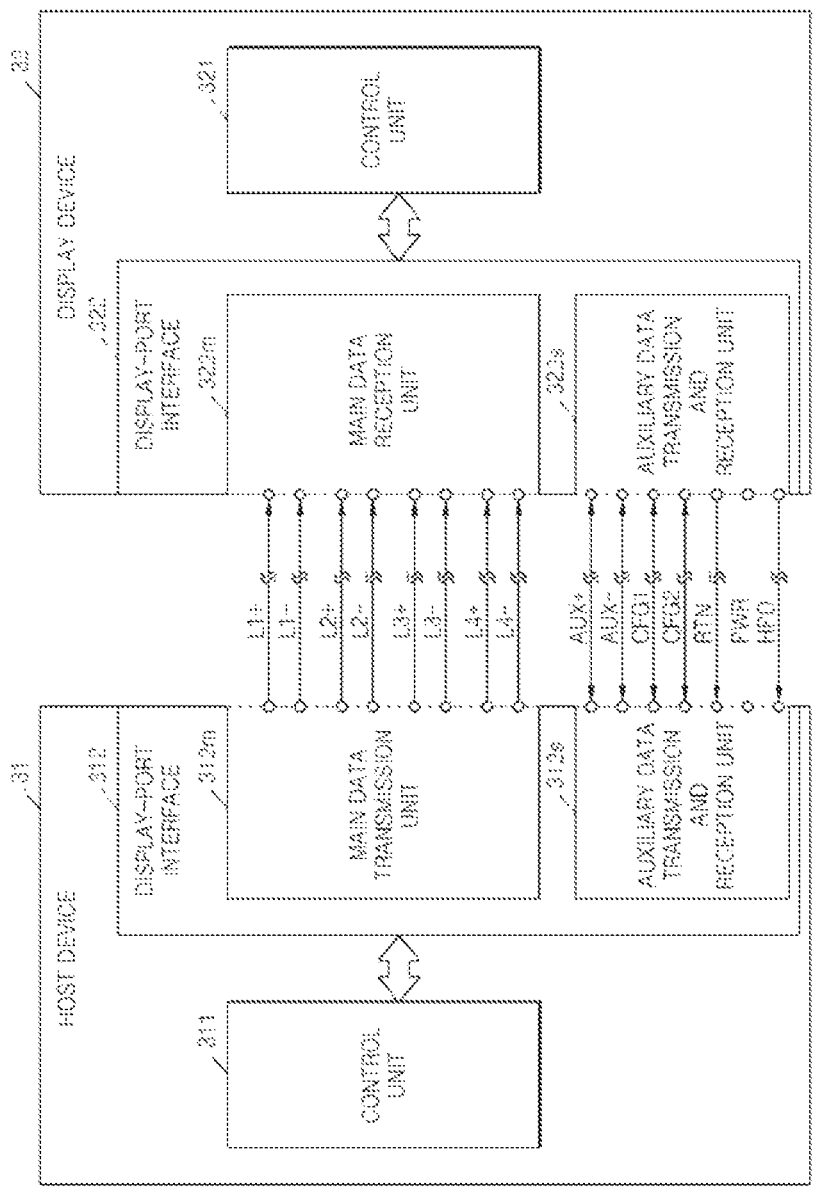
[Fig. 3]

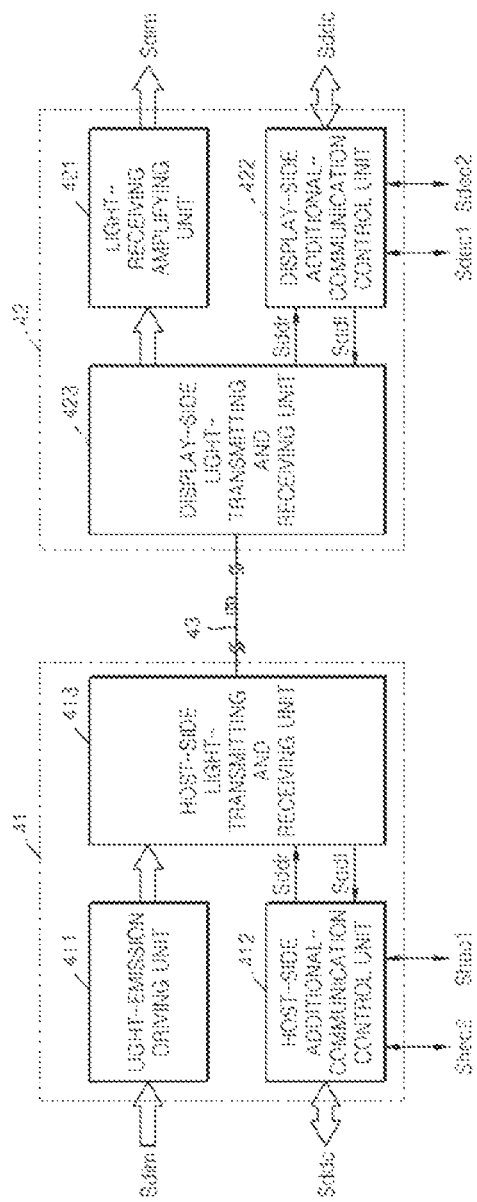
[Fig. 4]

[Fig. 5]
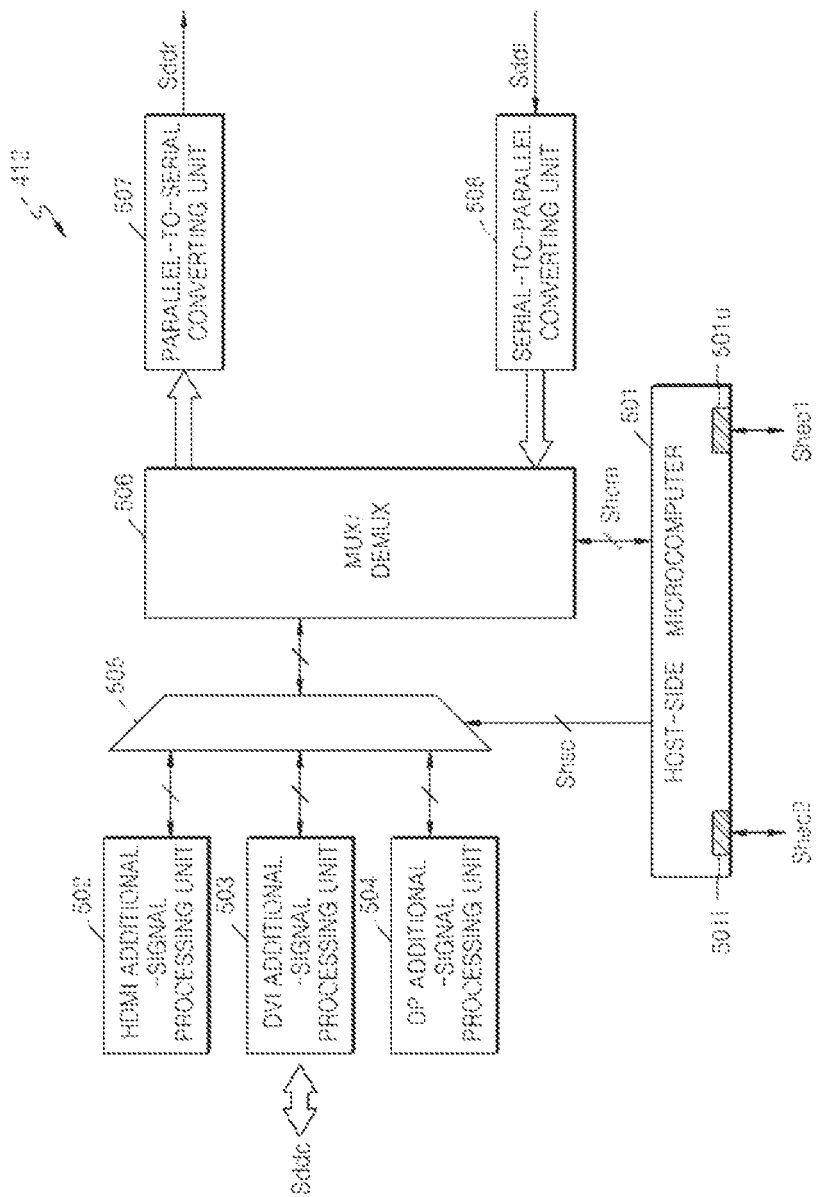

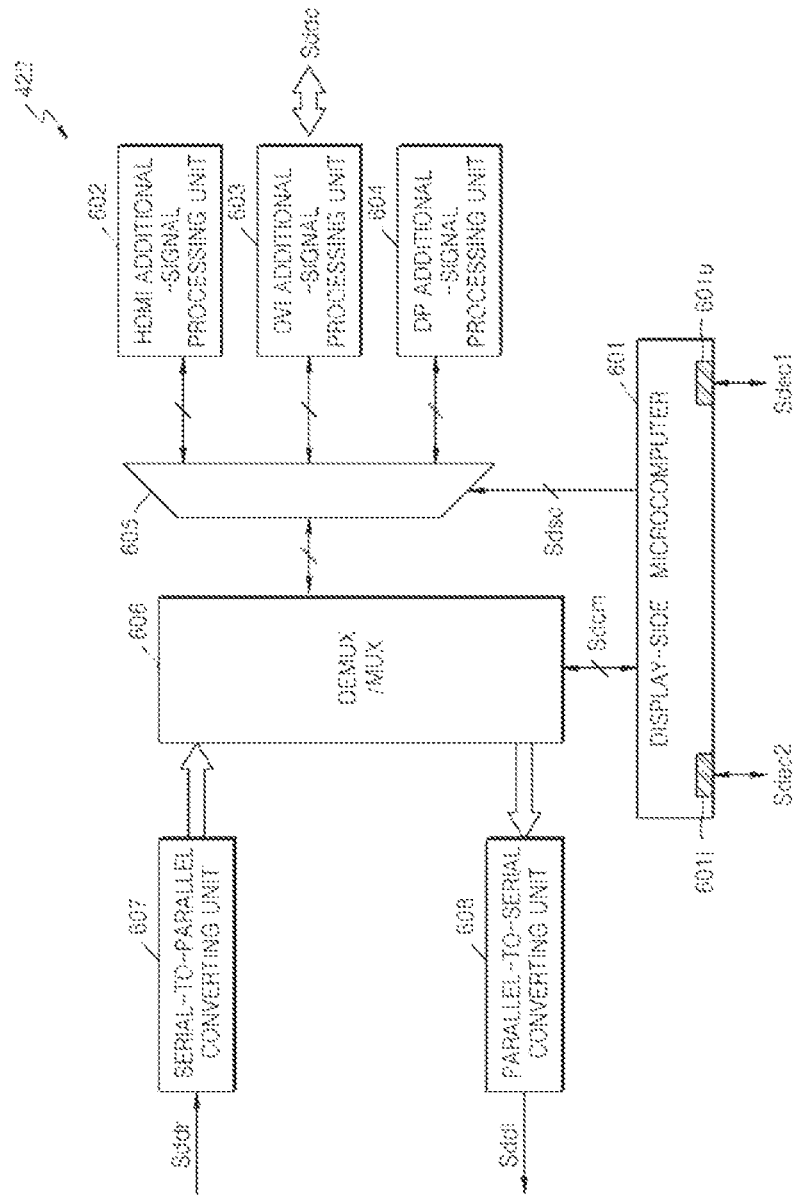
[Fig. 6]

[Fig. 7]
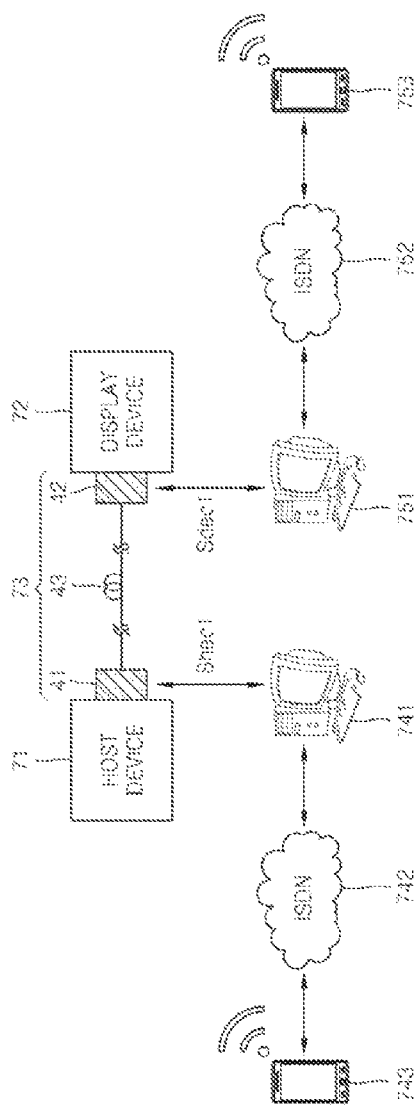
[Fig. 8]
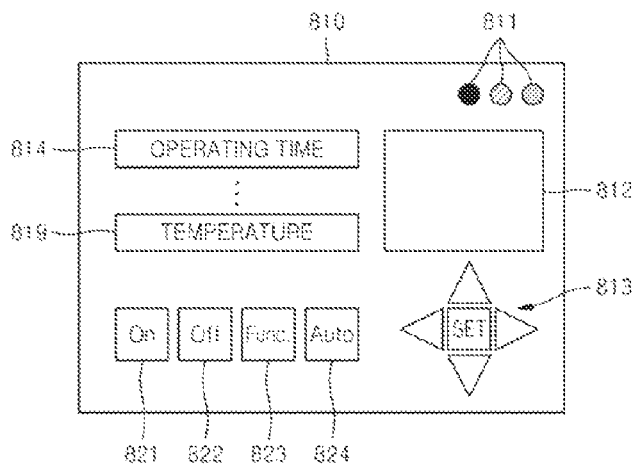

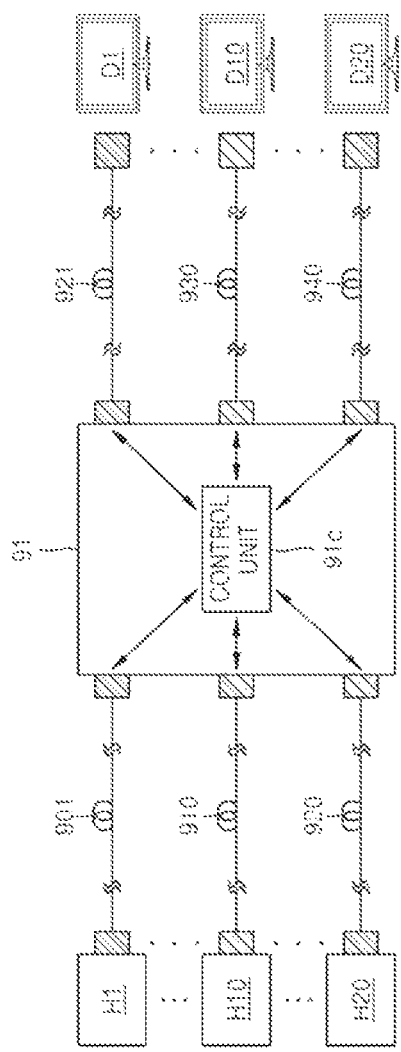
[Fig. 9]

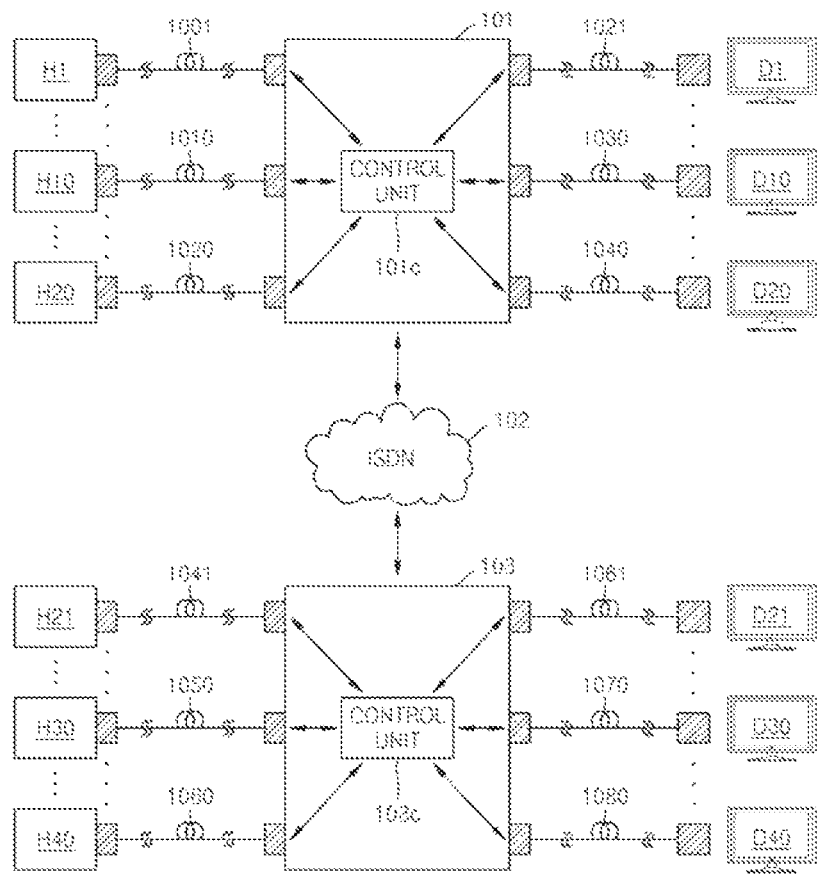
[Fig. 10]

DIGITAL-IMAGE TRANSMISSION APPARATUS WHICH PERFORMS COMMUNICATION, SELF-DIAGNOSIS, AND CONTROL

TECHNICAL FIELD

One or more embodiments of the present invention relate to a digital-image transmission apparatus that transmits digital image data, and more particularly, to a digital-image transmission apparatus that includes a transmission unit connected to a host device and a reception unit connected to a display device.

BACKGROUND ART

FIG. 1 illustrates a digital-image system in a basic high definition multimedia interface (HDMI) form.

Referring to FIG. 1, the digital image system in the basic HDMI form includes a host device 11, a display device 12, and an electric cable. Herein, the electric cable is connected between input/output terminals $T_{H1}$ to $T_{13}$ of the host device 11 and input/output terminals $T_{D1}$ to $T_{D13}$ of the display device 12.

The host device 11 includes an HDMI transmission unit 111 and a graphic control unit 112. The display device 12 includes a serial EEPROM (electrically erasable and programmable read only memory) 122, and an HDMI reception unit 121.

The HDMI transmission unit 111 of the host device 11 converts audio data $S_{AUD}$, a clock signal $S_{CS}$, and digital image data $S_{VID}$ into transition minimized differential signaling (TMDS) signals according to the HDMI form, and outputs the TMDS signals to the display device 12.

More specifically, the audio data $S_{AUD}$ and the digital image data $S_{VID}$ are processed in the HDMI transmission unit 111 and then are output as two-channel red signals $S_{R+}$ and $S_{R-}$, two-channel green signals $S_{G+}$ and $S_{G-}$, and two-channel blue signals $S_{B+}$ and $S_{B-}$. The clock signal $S_{CS}$ is processed by the HDMI transmission unit 111 and is output as two-channel clock signals CLK+ and CLK−.

In communication of a display data channel (DDC) as additional communication for digital image transmission, the graphic control unit 112 in the host device 11 communicates with the HDMI reception unit 121 in the display device 12 according to an inter-integrated circuit (I²C) communication protocol. That is, the graphic control unit 112 transmits a clock signal SCL to the HDMI reception unit 121 and exchanges a data signal SDA with the HDMI reception unit 121.

The HDMI reception unit 121 in the display device 12 stores extended display identification data (EDID) of the display device 12 in the serial EEPROM 122, and provides the EDID to the graphic control unit 112 in the host device 11. Thereafter, the HDMI reception unit 121 receives image data from the HDMI transmission unit 111 while performing high-bandwidth digital content protection (HDCP) communication with the graphic control unit 112.

First, the graphic control unit 112 transmits a +5V signal $S_{+5}$ to the serial EEPROM 122 for an operation of the HDMI reception unit 121. The HDMI reception unit 121 transmits a hot plug detect (HPD) signal voltage HPD to the graphic control unit 112, and the graphic control unit 112 senses connection with the display device 12.

The graphic control unit 112 in the host device 11 performs HDCP communication with the HDMI reception unit 121 while controlling an operation of the HDMI transmission unit 111 according to the EDID.

The HDMI reception unit 121 in the display device 12 decompresses TMDS signals in the HDMI form from the host device 11 into the audio data $S_{AUD}$, the clock signal $S_{CS}$, and the digital image data $S_{VID}$.

For reference, as to a reference code, consumer electronics control (CEC), of FIG. 1, a user remotely controls an operation of the display device 12 in the host device 11 by using a CEC channel. For example, the host device 11 controls power supply to the display device 12.

FIG. 2 illustrates a digital image system in a general digital visual interface (DVI) form. In FIG. 2, the same reference numeral as that used in FIG. 1 indicates a target having the same function as in FIG. 1. Only differences of the system illustrated in FIG. 2 with respect to the system illustrated in FIG. 1 are described as follows. 3

Referring to FIG. 2, the digital image system in the basic DVI form includes a host device 21, a display device 22, and an electric cable. Herein, the electric cable is connected between input/output terminals $T_{H1}$ to $TH_{14}$ of the host device 21 and input/output terminals $T_{D1}$ to $T_{D14}$ of the display device 22.

The host device 21 includes a TDMS transmission unit 211 and a graphic control unit 212. The display device 22 includes a serial EEPROM 222 and a TMDS reception unit 221.

The TMDS transmission unit 211 in the host device 11 converts the clock signal SCS and the digital image data $S_{VID}$ into TMDS signals in the DVI form and outputs the TMDS signals to the display device 22.

In communication of a DDC as additional communication for digital image transmission, the serial EEPROM 222 in the display device 22 stores EDID of the display device 22 and provides the EDID to the graphic control unit 212 in the host device 21 according to the I²C communication protocol.

The graphic control unit 212 in the host device 21 controls the operation of the TMDS transmission unit 211 according to the EDID.

The TMDS reception unit 221 in the display device 22 decompresses the TMDS signals in the DVI form from the host device 21 into the clock signal $S_{CS}$ and the digital image data $S_{VID}$.

FIG. 3 illustrates a typical display-port system according to display-port communication rules of the Video Electronics Standards Association (VESA). Referring to FIG. 3, the typical display-port system is described below.

In a control unit 321 in a display device 32, EDID, which is configuration information and control information of the display device 32, and display-port configuration data (DPCD), which is reception-condition information of the display device 32, are recorded.

After a control unit 311 in a host device 31 receives the EDID and the DPCD stored in a serial EEPROM in the display device 32 according to the display-port communication rules, that is, performs initial communication of an auxiliary channel as an additional channel for digital image transmission, the control unit 311 transmits main data to the control unit 321 in the display device 32 according to the received EDID and DPCD. Herein, the main data means image signals in which clock signals are embedded.

In this transmission process, the control unit 311 in the host device 31 performs communication of the DPCD, that is, main communication of an auxiliary channel as an additional channel, with the control unit 321 in the display device 32 according to the display-port communication rules of the VESA. This DPCD communication (also referred to as communication for "link training") will be summarized as below.

First, the control unit 311 in the host device 31 transmits scheduled transmission-condition information of the host device 31 to the control unit 321 in the display device 32 according to the received DPCD.

Second, the control unit 321 in the display device 32 receives main data according to the received transmission-condition information.

Third, the control unit 321 in the display device 32 transmits a signal indicating that a transmission condition is not suitable for itself to the control unit 311 in the host device 31 through a connection signal HPD, if an error occurs during reception of the main data. For example, the control unit 321 in the display device 32 transmits the connection signal HPD of a pulse train including repetition of logic '1' and '0' to the control unit 311 in the host device 31. For reference, when the display device 32 operates normally, the control unit 321 in the display device 32 transmits the connection signal HPD of logic '1' to the control unit 311 of the host device 31.

Fourth, if the signal indicating that the transmission condition is not suitable for the control unit 321 is generated through the connection signal HPD, the control unit 311 in the host device 31 changes the scheduled transmission-condition information of the host device 31 and transmits the changed transmission-condition information to the control unit 321 in the display device 32.

Fifth, second to fourth operations are performed repetitively.

A display-port interface 312 in the host device 31 includes a main data transmission unit 312m and an auxiliary data transmission and reception unit 312s.

The main data transmission unit 312m converts parallel main data from the controller 311 into differential auxiliary signals, and transmits them as 4 pairs of differential auxiliary signals (L1+, L1−), (L2+, L2−), (L3+, L3−), and (L4+, L4−) of 8 lines.

The auxiliary data transmission and reception unit 312s receives 1 pair of differential auxiliary signals (AUX+, AUX−) of two lines from the display device 32, converts them into parallel input signals according to the display-port communication rules, and inputs the parallel input signals to the control unit 311. For this communication, the auxiliary data transmission and reception unit 312s converts parallel output signals from the control unit 311 into differential auxiliary signals according to the display-port communication rules, and transmits 1 pair of differential auxiliary signals (AUX+, AUX−) of two lines to the display device 32.

The control unit 321 in the display device 32 transmits the EDID and the DPCD recorded according to the display-port communication rules to the control unit 311 in the host device 31, and receives main data from the control unit 311 in the host device 31.

A display-port interface 322 in the display device 32 includes a main data reception unit 322m and an auxiliary data transmission and reception unit 322s.

The main data reception unit 322m converts 4 pairs of differential auxiliary signals (L1+, L1−), (L2+, L2−), (L3+, L3−), and (L4+, L4−) of 8 lines into parallel input signals according to the display-port communication rules and inputs the parallel input signals to the control unit 321.

The auxiliary data transmission and reception unit 322s converts parallel output signals from the control unit 321 into differential auxiliary signals according to the display-port communication rules and transmits 1 pair of differential auxiliary signals (AUX+, AUX−) of 2 lines to the host device 31. For this communication, the auxiliary data transmission and reception unit 322s receives 1 pair of differential auxiliary signals (AUX+, AUX−) of 2 lines from the host device 31, converts them into parallel input signals according to the display-port communication rules, and inputs the parallel input signals to the control unit 321.

In FIG. 3, a reference numeral PWR indicates a terminal that outputs a power of 1.5 W or higher with a voltage of about 3.3V. A reference numeral RTN refers to a return power channel in which current used in the display device 32 flows to the host device 31.

In FIG. 3, a reference numeral CFG1 indicates a channel that determines a communication scheme of auxiliary data. If the CFG1 channel has a logic "0" state, the display-port communication scheme based on Manchester II coding is used.

If the CFG1 channel has a logic "1" state, the HDMI communication scheme based on the IPC communication protocol is used. Herein, a reference numeral CFG2 refers to a CEC channel available when the HDMI communication scheme is used.

In the typical digital image system described with reference to FIGS. 1 to 3, if a distance between the host device 11, 21, or 31 and the display device 12, 22, or 32 is long, a digital-image transmission apparatus is needed.

That is, a digital-image transmission apparatus including a transmission unit connected to a host device and a reception unit connected to a display device is needed. Herein, between the transmission unit and the reception unit, wired communication based on an electric cable or optical cable or wireless communication may be performed.

In a function of the digital-image transmission apparatus, conventionally, only a unique image transmission function is provided and interaction with the user is not provided.

DISCLOSURE OF INVENTION

Technical Problem

One or more embodiments of the present invention include a digital-image transmission apparatus that allows interaction with a user.

Additional aspects will be set forth in part in the description which follows and, in part, will be apparent from the description, or may be learned by practice of the presented embodiments.

Solution to Problem

According to one or more embodiments of the present invention, a digital-image transmission apparatus includes a transmitting unit connected to a host device and a receiving unit connected to a display device, in which the transmitting unit includes a host-side additional-communication control unit that controls additional communication for digital-image transmission.

The host-side additional-communication control unit performs communication with an external device to diagnose an operation state of the transmitting unit, transmit a diagnosis result to the external device, and control an operation of the transmitting unit.

The receiving unit includes a display-side additional-communication control unit that controls the additional communication for the digital-image transmission.

The display-side additional-communication control unit performs communication with an external device to diagnose an operation state of the receiving unit, transmit a diagnosis result to the external device, and control an operation of the receiving unit.

An optical cable is connected between the transmitting unit and the receiving unit.

The host-side additional-communication control unit performs mutual communication with the display-side additional-communication control unit through the optical cable to be provided with a diagnosis result of the receiving unit, and control an operation of the receiving unit.

The display-side additional-communication control unit performs mutual communication with the host-side additional-communication control unit through the optical cable to be provided with a diagnosis result of the transmitting unit and control an operation of the transmitting unit.

The transmitting unit further includes a light-emission driving unit and a host-side light-transmitting and receiving unit.

The light-emission driving unit operates under control of the host-side additional-communication control unit and generates light-emission driving signals corresponding to digital-image data.

The host-side light-transmitting and receiving unit operates under control of the host-side additional-communication control unit, generates light-transmitting signals according to transmitting signals from the light-emission driving unit and the host-side additional-communication control unit, transmits the generated light-transmitting signals to the receiving unit through the optical cable, converts light-receiving signals from the receiving unit into electric signals, and inputs the electric signals to the host-side additional-communication control unit.

The receiving unit includes a display-side light transmitting and receiving unit and a light-receiving amplification unit.

The display-side light transmitting and receiving unit operates under control of the display-side additional-communication control unit, generates light-transmitting signals according to transmitting signals from the display-side additional-communication control unit, transmits the generated light-transmitting signals to the transmitting unit through the optical cable, converts light-receiving signals from the host-side light transmitting and receiving unit into electric signals, and outputs the electric signals.

The light-receiving amplification unit operates under control of the display-side additional-communication control unit, amplifies image signals among the light-receiving signals from the display-side light transmitting and receiving unit for reconstruction of digital image data, and inputs the digital image data to the display device.

An additional signal from the host-side additional-communication control unit is input to the display-side additional-communication control unit through the host-side light-transmitting and receiving unit, the optical cable, and the display-side light-transmitting and receiving unit.

The host-side additional-communication control unit includes a host-side microcomputer, an HDMI additional-signal processing unit, a DVI additional-signal processing unit, a DP additional-signal processing unit, an additional-signal selecting unit, a multiplexer/demultiplexer, a parallel-to-serial converting unit, and a serial-to-parallel converting unit.

The host-side microcomputer includes at least a first serial communication interface and a second serial communication interface and performs communication with an external device through the first serial communication interface to diagnose the operation state of the transmitting unit, transmit the diagnosis result to the external device, and control the operation of the transmitting unit.

The HDMI additional-signal processing unit inputs an additional signal in an HDMI form, which is input from the host device through an HDMI transmission and reception line, to the additional-signal selecting unit through a transmission line, and inputs an additional signal in an HDMI form, which is input from the additional-signal selecting unit through a reception line, to the host device through the HDMI transmission and reception line.

The DVI additional-signal processing unit inputs an additional signal in a DVI form, which is input from the host device through a DVI transmission and reception line, to the additional-signal selecting unit through a transmission line, and inputs an additional signal in a DVI form, which is input from the additional-signal selecting unit through a reception line, to the host device through the DVI transmission and reception line.

The DP additional-signal processing unit inputs an additional signal in a DP form, which is input from the host device through a DP transmission and reception line, to the additional-signal selecting unit through a transmission line, and inputs an additional signal in a DP form, which is input from the additional-signal selecting unit through a reception line, to the host device through the DP transmission and reception line.

The additional-signal selecting unit inputs an additional signal from any one selected from among the HDMI additional-signal processing unit, the DVI additional-signal processing unit, and the DP additional-signal processing unit according to a selection command signal from the host-side microcomputer to the multiplexer/demultiplexer, and inputs an additional signal from the multiplexer/demultiplexer to the selected any one additional-signal processing unit.

The multiplexer/demultiplexer performs multiplexing with respect to the additional signal from the additional-signal selecting unit and a transmitting signal for external communication from the host-side microcomputer to generate a mixed transmitting signal and inputs the generated mixed transmitting signal to the parallel-to-serial converting unit.

The multiplexer/demultiplexer extracts an additional signal and a receiving signal for external communication from a mixed receiving signal from the serial-to-parallel converting unit, inputs the extracted additional signal to the additional-signal selecting unit, and inputs the extracted receiving signal for external communication to the host-side microcomputer.

The parallel-to-serial converting unit converts the mixed transmitting signal from the multiplexer/demultiplexer into a serial signal and transmits the serial signal to the receiving unit.

The serial-to-parallel converting unit converts the mixed receiving unit from the receiving unit into a parallel signal and inputs the parallel signal to the multiplexer/demultiplexer.

The display-side additional-communication control unit includes a display-side microcomputer, a serial-to-parallel converting unit, a parallel-to-serial converting unit, a demultiplexer/multiplexer, an additional-signal selecting unit, an HDMI additional-signal processing unit, a DVI additional-signal processing unit, and a DP additional-signal processing unit.

The display-side microcomputer includes at least a first serial communication interface and a second serial communication interface and performs communication with an external device through the first serial communication interface to diagnose an operation state of the receiving unit, transmit a diagnosis result to the external device, and control an operation of the receiving unit.

The serial-to-parallel converting unit converts a mixed receiving signal from the host-side additional-communication control unit into a parallel signal and inputs the parallel signal to the demultiplexer/multiplexer.

The parallel-to-serial converting unit converts a mixed transmitting signal from the demultiplexer/multiplexer into a serial signal and transmits the serial signal to the host-side additional-communication control unit.

The demultiplexer/multiplexer extracts the mixed receiving signal from the serial-to-parallel converting unit, inputs the extracted additional signal to the additional-signal selecting unit, and inputs the extracted receiving signal for external communication to the display-side microcomputer.

The demultiplexer/multiplexer performs multiplexing with respect to an additional signal from the additional-signal selecting unit and a transmitting signal for external communication from the display-side microcomputer to generate a mixed transmitting signal and inputs the mixed transmitting signal to the parallel-to-serial converting unit.

The additional-signal selecting unit inputs an additional signal from any one selected from among the HDMI additional-signal processing unit, the DVI additional-signal processing unit, and the DP additional-signal processing unit according to a selection command signal from the display-side microcomputer to the demultiplexer/multiplexer and inputs an additional signal from the demultiplexer/multiplexer to the selected any one additional-signal processing unit.

The HDMI additional-signal processing unit inputs an additional signal in a HDMI form, which is input from the additional-signal selecting unit through a reception line, to the display device through the HDMI transmission and reception line and inputs an additional signal in an HDMI form, which is input from the display device through the HDMI transmission and reception line, to the additional-signal selecting unit through a transmission line.

The DVI additional-signal processing unit inputs an additional signal in a DVI form, which is input from the additional-signal selecting unit through a reception line, to the display device through the DVI transmission and reception line, and inputs an additional signal in the DVI form, which is input from the display device through the DVI transmission and reception line, to the additional-signal selecting unit through a transmission line.

The DP additional-signal processing unit inputs an additional signal in a DP form, which is input from the additional-signal selecting unit through a reception line, to the display device through a DP transmission and reception line, and inputs an additional signal in the DP form, which is input from the display device through the DP transmission and reception line, to the additional-signal selecting unit through a transmission line.

Advantageous Effects of Invention

With the digital-image transmission apparatus according to the one or more of the above embodiments of the present invention, the host-side additional-communication control unit of the transmitting unit performs communication with an external device to diagnose the operation state of the transmitting unit, transmit the diagnosis result to the external device, and control the operation of the transmitting unit.

Thus, the user's computer or terminal may communicate with the host-side additional-communication control unit. Hence, the user may diagnose the operation state of the transmitting unit and control the operation of the transmitting unit. As a simple example for controlling the operation of the transmitting unit, transmission of digital image data may be stopped or resumed when necessary.

Moreover, the display-side additional-communication control unit of the receiving unit performs communication with the external device to diagnose the operation state of the receiving unit, transmit the diagnosis result to the external device, and control the operation of the receiving unit.

Therefore, the user s computer or terminal communicates with the display-side additional-communication control unit. Thus, the user diagnoses the operation state of the receiving unit and controls the operation of the receiving unit. As a simple example for controlling the operation of the receiving unit, reception of the digital image data may be stopped or resumed.

Furthermore, if the optical cable is connected between the transmitting unit and the receiving unit, the host-side additional-communication control unit is provided with the diagnosis result of the receiving unit and controls the operation of the receiving unit, while performing mutual communication with the display-side additional-communication control unit through the optical cable.

Thus, the user situated in the position of the host device is provided with the diagnosis result of the receiving unit located in a remote place and controls the operation of the receiving unit through the host-side additional-communication control unit.

In addition, the display-side additional-communication control unit is provided with the diagnosis result of the transmitting unit and controls the operation of the transmitting unit, while performing mutual communication with the host-side additional-communication control unit through the optical cable.

Thus, the user situated in the position of the display device is provided with the diagnosis result of the transmitting unit located in the remote place and controls the operation of the transmitting unit.

BRIEF DESCRIPTION OF DRAWINGS

FIG. 1 illustrates a digital-image system in a basic high definition multimedia interface (HDMI) form.

FIG. 2 illustrates a digital-image system in a basic digital visual interface (DVI) form.

FIG. 3 illustrates a digital-image system in a basic display port (DP) form.

FIG. 4 illustrates a digital-image transmission apparatus according to an embodiment of the present invention used in a digital-image system illustrated in FIGS. 1 to 3.

FIG. 5 illustrates an internal structure of a host-side additional communication control unit of a transmitting unit illustrated in FIG. 4.

FIG. 6 illustrates an internal structure of a display-side additional communication control unit of a reception unit illustrated in FIG. 4.

FIG. 7 illustrates a first example in which the digital-image transmission apparatus according to an embodiment of the present invention is applied.

FIG. 8 illustrates an example of a screen of a graphic user interface (GUI) in a user computer or a user communication terminal shown in FIG. 7.

FIG. 9 illustrates a second example in which a digital-image transmission apparatus according to an embodiment of the present invention is applied.

FIG. 10 illustrates a third example in which a digital-image transmission apparatus according to an embodiment of the present invention is applied.

BEST MODE FOR CARRYING OUT THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

Accordingly, the embodiments are merely described below, by referring to the figures, to explain aspects of the present description.

The following description and attached drawings are provided to understand operations according to the invention, and parts that can be easily implemented by those of ordinary skill in the art may be omitted.

The specification and drawings are not intended to limit the invention and the scope of the invention should be defined by appended claims. Terms used in the specification should be construed as meanings and concepts which coincide with the technical spirit of the invention to most properly describe the invention.

Hereinafter, embodiments of the present invention will be described in detail with reference to the accompanying drawings. In the specification and the drawings, like reference numerals will refer to components having substantially identical functions and thus will not be repetitively described.

FIG. 4 illustrates a digital-image transmission apparatus according to an embodiments of the present invention used in the digital-image system illustrated in FIGS. 1 to 3.

The digital-image transmission apparatus according to an embodiment of the present invention will be described with reference to FIGS. 1 to 4.

The digital-image transmission apparatus according to an embodiment of the present invention includes a transmitting unit 41 connected to the host device 11, 21, or 31 and a receiving unit 42 connected to the display device 12, 22, or 32. In the current embodiment, an optical cable 43 is used between the transmitting unit 41 and the receiving unit 42, but an electric cable or wireless communication may also be used.

The transmitting unit 41 includes a host-side additional-communication control unit 412 that controls additional communication for digital image transmission. In FIG. 4, a reference numeral Sddc indicates a bidirectional additional signal between the host device 11, 21, or 31 and the display device 12, 22, or 32, a reference numeral Sddr indicates an additional signal transmitted from the host-side additional-communication control unit 412 to a display-side additional-communication control unit 422, and a reference numeral Sddl indicates an additional signal transmitted from the display-side additional-communication control unit 422 to the host-side additional-communication control unit 412.

Herein, the host-side additional-communication control unit 412 performs communication with an external device to diagnose an operation state of the transmitting unit 41, transmit a diagnosis result to the external device, and control an operation of the transmitting unit 41. In FIG. 4, a reference numeral Shec1 indicates a serial communication signal transmitted and received between the host-side additional-communication control unit 412 and a first external device, for example, a communication signal in a universal serial bus (USB) form. In FIG. 4, a reference numeral Shec2 indicates a serial communication signal transmitted and received between the host-side additional-communication control unit 412 and a second external device, for example, a communication signal in an PC communication form.

Therefore, a user's computer or terminal communicates with the host-side additional-communication control unit 412. Hence, the user may diagnose the operation state of the transmitting unit 41 and control the operation of the transmitting unit 41. As a simple example of controlling the operation of the transmitting unit 41, transmission of digital image data may be stopped or resumed when necessary.

The receiving unit 42 includes the display-side additional-communication control unit 422 that controls additional communication for digital image transmission.

Herein, the display-side additional-communication control unit 422 performs communication with an external device to diagnose the operation state of the receiving unit 42, transmit a diagnosis result to the external device, and control the operation of the receiving unit 42. In FIG. 4, a reference numeral Sdec1 indicates a serial communication signal transmitted and received between the display-side additional-communication control unit 422 and the first external device, for example, a communication signal in the USB form. In FIG. 4, a reference numeral Sdec2 indicates a serial communication signal transmitted and received between the display-side additional-communication control unit 422 and the second external device, for example, a communication signal in the I$^2$C communication form.

Thus, the user's computer or terminal communicates with the display-side additional-communication control unit 422. Hence, the user may diagnose the operation state of the receiving unit 42 and control the operation of the receiving unit 42. As a simple example of controlling the operation of the receiving unit 42, reception of digital image data may be stopped or resumed when necessary.

In addition, the host-side additional-communication control unit 412 according to the current embodiment receives the diagnosis result of the receiving unit 42 and control the operation of the receiving unit 42 while performing mutual communication with the display-side additional-communication control unit 422 through the optical cable 43.

As a result, the user in the host device 11, 21, or 31 receives the diagnosis result of the receiving unit 42 located in a remote place and controls the operation of the receiving unit 42 through the host-side additional-communication control unit 412.

On the other hand, the display-side additional-communication control unit 422 receives the diagnosis result of the transmitting unit 41 and controls the operation of the transmitting unit 41, while performing mutual communication with the host-side additional-communication control unit 412 through the optical cable 43.

Thus, the user situated in the position of the display device 12, 22, or 32 receives the diagnosis result of the transmitting unit 41 located in a remote place and controls the operation of the transmitting unit 41 through the display-side additional-communication control unit 422.

In the current embodiment, the transmitting unit 41 further includes a light-emission driving unit 411 and a host-side light-transmitting and receiving unit 413.

The light-emission driving unit 411 generates a light-emission driving signals corresponding to digital image data Sdim, while operating under control of the host-side additional-communication control unit 412.

The host-side light-transmitting and receiving unit 41 generates an light-transmitting signal according to a transmitting signal Sddr from the light-emission driving unit 411 and the host-side additional-communication control unit 412, transmits the generated light-transmitting signal to the receiving unit 42 through the optical cable 43, converts an light-receiving signal from the receiving unit 42 into an electric signal Sddl, and inputs the electric signal Sddl to the host-side additional-communication control unit 412.

The receiving unit 42 may further include a display-side light-transmitting and receiving unit 423 and a light-receiving amplifying unit 421.

While operating under control of the display-side additional-communication control unit 422, the display-side light-transmitting and receiving unit 423 generates an light-transmitting signal according to the transmitting signal Sddl from the display-side additional-communication control unit 422, transmits the generated light-transmitting signal to the transmitting unit 41 through the optical cable 43, converts the light-receiving signal from the host-side light-transmitting and receiving unit 413 into an electric signal, and outputs the electric signal.

Herein, the additional signal Sddr from the host-side additional-communication control unit 412 is input to the display-side additional-communication control unit 422 through the host-side light-transmitting and receiving unit 413, the optical cable 43, and the display-side light-transmitting and receiving unit 423.

While operating under control of the display-side additional-communication control unit 422, the light-receiving amplifying unit 421 amplifies an image signal of the light-receiving signal from the display-side light-transmitting and receiving unit 423 to re-construct the digital image data Sdim and inputs the digital image data Sdim to the display device 12, 22, or 32.

FIG. 5 illustrates an internal structure of the host-side additional-communication control unit 412 of the transmitting unit 41 of FIG. 4. In FIG. 5, the same reference numerals as used in FIG. 4 indicate a target having the same function as in FIG. 4.

Referring to FIGS. 4 and 5, the internal structure and operation of the host-side additional-communication control unit 412 of the transmitting unit 41 will be described below.

The host-side additional-communication control unit 412 of the transmitting unit 41 may include a host-side microcomputer 501, an HDMI additional-signal processing unit 502, a DVI additional-signal processing unit 503, a DP additional-signal processor 504, an additional-signal selecting unit 505, a multiplexer/demultiplexer 506, a parallel-to-serial converting unit 507, and a serial-to-parallel converting unit 508.

The host-side microcomputer 501 may include at least a first serial communication interface 501$u$ and a second serial communication interface 501$i$. The host-side microcomputer 501 performs communication with an external device through the first serial communication interface 501$u$ to diagnose the operation state of the transmitting unit 41, transmit the diagnosis result to the external device, and control the operation of the transmitting unit 41.

For example, the first serial communication interface 501$u$ is an interface in the USB form, and the second serial communication interface 501$i$ is an interface in the IPC form. The second serial communication interface 501$i$ may be used for communication with another digital-image transmission apparatus according to the current embodiment.

The HDMI additional-signal processing unit 502 inputs the additional signal Sddc in the HDMI form, which is input from a host device (11 of FIG. 1, 21 of FIG. 2, or 31 of FIG. 3) through an HDMI transmission and reception line, to the additional-signal selecting unit 505 through the transmission line.

The HDMI additional-signal processing unit 502 inputs an additional signal in the HDMI form, which is input from the additional-signal selecting unit 505 through the reception line, to the host device 11, 21, or 31 through the HDMI transmission and reception line.

The DVI additional-signal processing unit 503 inputs the additional signal in the DVI form, which is input from the host device 11, 21, or 31 through a DVI transmission and reception line, to the additional-signal selecting unit 505 through the transmission line.

The DVI additional-signal processing unit 503 inputs the additional signal in the DVI form, which is input from the additional-signal selecting unit 505 through the reception line, to the host device 11, 21, or 31 through the DVI transmission and reception line.

The DP additional-signal processing unit 503 inputs the additional signal in the DP form, which is input from the host device 11, 21, or 31 through a DP transmission and reception line, to the additional-signal selecting unit 505 through the transmission line.

The DP additional-signal processing unit 503 inputs the additional signal in the DP form, which is input from the additional-signal selecting unit 505 through the reception line, to the host device 11, 21, or 31 through the DP transmission and reception line.

The additional-signal selecting unit 505 inputs the additional signal from any one selected from among the HDMI additional-signal processing unit 502, the DVI additional-signal processing unit 503, and the DP additional-signal processing unit 504 according to a selection command signal Shsc from the host-side microcomputer 501, to the multiplexer/demultiplexer 506, and inputs the additional signal from the multiplexer/demultiplexer 506 to the selected additional-signal processing unit.

The multiplexer/demultiplexer 506 performs multiplexing with respect to the additional signal from the additional-signal selecting unit 505 and a transmitting signal Shcm for external communication from the host-side microcomputer 501 to generate a mixed transmitting signal and inputs the generated mixed transmitting signal to the parallel-to-serial converting unit 507.

The multiplexer/demultiplexer 506 extracts an additional signal and a reception signal Shcm for external communication from the mixed reception signal from the serial-to-parallel converting unit 508, inputs the extracted additional signal to the additional-signal selecting unit 505, and inputs the extracted reception signal Shcm for external communication to the host-side microcomputer 501.

The parallel-to-serial converting unit 507 converts the mixed transmitting signal Sddr from the multiplexer/demultiplexer 506 into a serial signal for transmission to the receiving unit 42.

The serial-to-parallel converting unit 508 converts the mixed reception signal Sddl from the receiving unit 42 into a parallel signal for input to the multiplexer/demultiplexer 506.

FIG. 6 illustrates an internal structure of the display-side additional-communication control unit 422 of the receiving unit 42 illustrated in FIG. 4. In FIG. 6, the same reference numeral as used in FIGS. 4 and 5 indicates a target having the same function as in FIGS. 4 and 5. With reference to FIGS. 4 to 6, a description will be made of the internal structure and operation of the display-side additional-communication control unit 422 of the receiving unit 42.

The display-side additional-communication control unit 422 of the receiving unit 42 may include a display-side microcomputer 601, a serial-to-parallel converting unit 607, a parallel-to-serial converting unit 608, a demultiplexer/multiplexer 606, an additional-signal selecting unit 605, an HDMI additional-signal processing unit 602, a DVI additional-signal processing unit 603, and a DP additional-signal processing unit 604.

The display-side microcomputer 601 may include at least a first serial communication interface 601u and a second serial communication interface 601i. The display-side microcomputer 601 performs communication with an external device though the first serial communication interface 601u to diagnose the operation state of the receiving unit 42, transmit the diagnosis result to the external device, and control the operation of the receiving unit 42.

For example, the first serial communication interface 601u is an interface in the USB form, and the second serial communication interface 601i is an interface in the I$^2$C form. The second serial communication interface 601i may be used for communication with another digital-image transmission apparatus according to the current embodiment.

The serial-to-parallel converting unit 607 converts a mixed reception signal Sddr from the host-side additional-communication control unit 412 into a parallel signal for input to the demultiplexer/multiplexer 606.

The paralle-to-serial converting unit 608 converts a mixed transmitting signal from the demultiplexer/multiplexer 606 into a serial signal Sddl for transmission to the additional-communication control unit 412.

The demultiplexer/multiplexer 606 extracts an additional signal and a reception signal Sdcm for external communication from the mixed reception signal Sddr from the serial-to-parallel converting unit 607, inputs the extracted additional signal to the additional-signal selecting unit 605, and inputs the extracted reception signal Sdcm for external communication to the display-side microcomputer 601.

The demultiplexer/multiplexer 606 performs multiplexing with respect to the additional signal from the additional-signal selecting unit 605 and the transmitting signal for external communication from the display-side microcomputer 601 to generate a mixed transmitting signal Sddl and inputs the generated mixed transmitting signal Sddl to the parallel-to-serial converting unit 608.

The additional-signal selecting unit 605 inputs an additional signal from one selected from among the HDMI additional-signal processing unit 602, the DVI additional-signal processing unit 603, and the DP additional-signal processing unit 604 according to a selection command signal Sdsc from the display-side microcomputer 601 to the demultiplexer/multiplexer 606, and inputs an additional signal from the demultiplexer/multiplexer 606 to the selected additional-signal processing unit.

The HDMI additional-signal processing unit 602 inputs an additional signal in the HDMI form, which is input from the additional-signal selecting unit 605 through a reception line, to the display device through the HDMI transmission and reception line.

The HDMI additional-signal processing unit 602 inputs an additional signal in the HDMI form, which is input from the display device 12, 22, or 32 of FIGS. 1 to 3 through the HDMI transmission and reception line, to the additional-signal selecting unit 606 through the transmission and reception line.

The DVI additional-signal processing unit 603 inputs an additional signal in the DVI form, which is input from the additional-signal selecting unit 605 through a reception line, to the display device 12, 22, or 32 through the DVI transmission and reception line.

The DVI additional-signal processing unit 603 inputs the additional signal in the DVI form, which is input from the display device 12, 22, or 32 through the DVI transmission and reception line, to the additional-signal selecting unit 605 through the transmission line.

The DP additional-signal processing unit 604 inputs an additional signal in the DP form, which is input from the additional-signal selecting unit 605 through the reception line, to the display device 12, 22, or 32 through the DP transmission and reception line.

The DP additional-signal processing unit 604 inputs an additional signal in the DP form, which is input from the display device 12, 22, or 32 through the DP transmission and reception line, to the additional-signal selecting unit 605 through the transmission line.

FIG. 7 illustrates a first example in which a digital-image transmission apparatus 73 according to an embodiment of the present invention is applied.

Referring to FIG. 7, the digital-image transmission apparatus 73 according to an embodiment of the present invention may include the transmitting unit 41 connected to a host device 71, the receiving unit 42 connected to a display device 72, and the optical cable 43 connecting the transmitting unit 41 with the receiving unit 42. As mentioned above, an electric cable or wireless communication may be used in place of the optical cable 43.

The host-side additional-communication control unit 412 of FIGS. 4 and 5 performs communication with a user's computer 741 to diagnose the operation state of the transmitting unit 41, transmit the diagnosis result to an external device, and control the operation of the transmitting unit 41. In FIG. 7, a reference numeral Shec1 indicates a serial communication signal, for example, a communication signal in the USB form, transmitted and received between the host-side additional-communication control unit 412 and the user's computer 741.

Thus, the user's computer 741 communicates with the host-side additional-communication control unit 412 of the transmitting unit 41. A user s communication terminal 743 communicates with the user s computer 741 through an integrated service digital network (ISDN).

Hence, the user diagnoses the operation state of the transmitting unit 41 and controls the operation of the transmitting unit 41 by using the computer 741 or the communication terminal 743.

The display-side additional-communication control unit 422 of FIGS. 4 and 6 of the receiving unit 42 performs communication with a user's computer 751 to diagnose the operation state of the receiving unit 42, transmit the diagnosis result to an external device, and control the operation of the receiving unit 42. In FIG. 7, a reference numeral Sdec1 indicates a serial communication signal, for example, a communication signal in the USB form, transmitted and received between the display-side additional-communication control unit 422 and the user's computer 751.

Thus, the user's computer 751 communicates with the display-side additional-communication control unit 422 of the receiving unit 42. A user s communication terminal 752 communicates with the user's computer 751 through the ISDN.

Hence, the user may diagnose the operation state of the receiving unit 42 and control the operation of the receiving unit 42 by using the computer 751 or the communication terminal 753.

In addition, the host-side additional-communication control unit 412 of the transmitting unit 41 is provided with the diagnosis result of the receiving unit 42 and controls the operation of the receiving unit 42, while performing mutual communication with the display-side additional-communication control unit 422 of the receiving unit 42 through the optical cable 43.

Hence, the user situated in the position of the host device 71 receives the diagnosis result of the receiving unit 41 located in a remote place and controls the operation of the receiving unit 42 through the host-side additional-communication control unit 412 of the transmitting unit 41.

On the other hand, the display-side additional-communication control unit 422 of the receiving unit 42 is provided with the diagnosis result of the transmitting unit 41 and controls the operation of the transmitting unit 41, while performing mutual communication with the host-side additional-communication control unit 412 through the optical cable 43.

Thus, the user situated in the position of the display device 72 is provided with the diagnosis result of the transmitting unit 41 located in a remote place and controls the operation of the transmitting unit 41 through the display-side additional-communication control unit 422 of the receiving unit 42.

FIG. 8 illustrates an example of a screen 810 of a graphic user interface (GUI) in the user's computers 741 and 751 or the user's communication terminals 743 and 753 illustrated in FIG. 7.

Referring to FIGS. 7 and 8, the user's computers 741 and 751 or the user's communication terminals 743 and 753 display transmission and reception state lamps 811 indicating a data transmission state to the user. The transmission and reception state lamps 811 indicate different data rates for different colors.

Once the user selects an operation state icon from a list of operation states 814 to 819 by using menu selection keys 813, an operation state corresponding to the selected operation state icon is displayed on a display window 812.

The user stops or resumes a transmission operation or a reception operation by using an ON key 821 and an OFF key 822.

If the user presses a function key 823, a function list is displayed on the display window 812.

Once the user presses an auto control key 824, auto control may be performed by a set program.

FIG. 9 illustrates a second example in which digital-image transmission apparatuses 901 to 940 according to an embodiment of the present invention are applied.

Referring to FIG. 9, the host-side digital-image transmission apparatuses 901 to 920 are connected between host devices H1 to H20 and input terminals of a matrix device 91. The matrix device 91 is a device for selectively switching and outputting input image signals according to user setting. That is, transmitting units of the host-side digital-image transmission apparatuses 901 to 920 are connected to the host devices H1 to H20, and receiving units of the host-side digital-image transmission apparatuses 901 to 920 are connected to the input terminals of the matrix device 91.

The display-side digital-image transmission apparatuses 921 to 940 are connected between output terminals of the matrix device 91 and display devices D1 to D20. That is, transmitting units of the display-side digital-image transmission apparatuses 921 to 940 are connected to the output terminals of the matrix device 91 and receiving units of the display-side digital-image transmission apparatuses 921 to 940 are connected to the display devices D to D20.

In such a matrix transmission system, a control unit 91c of the matrix device 91 communicates with all of the digital-image transmission apparatuses 901 to 940. Thus, the user is provided with the diagnosis results from the digital-image transmission apparatuses 901 to 940 on the screen of the GUI of the matrix device 91 and controls the operations of the digital-image transmission apparatuses 901 to 940.

FIG. 10 illustrates a third example in which digital-image transmission apparatuses according to an embodiment of the present invention are applied. Referring to FIG. 10, a first matrix transmission system and a second matrix transmission system are connected to a communication network, for example, an ISDN 102. That is, a control unit 101c of a first matrix device 101 communicates with a control unit 103c of a second matrix device 103 through the ISDN 102.

More specifically, in the first matrix transmission system, host-side digital-image transmission apparatuses 1001 to 1020 are connected between the host devices H1 to H20 and input terminals of the first matrix device 101. That is, transmitting units of the host-side digital-image transmission apparatuses 1001 to 1020 are connected to the host devices H1 to H20, and receiving units of the host-side digital-image transmission apparatuses 1001 to 1020 are connected to the input terminals of the first matrix device 101.

The display-side digital-image transmission apparatuses 1021 to 1040 are connected between output terminals of the first matrix device 101 and the display devices D1 to D20. That is, transmitting units of the display-side digital-image transmission apparatuses 1021 to 1040 are connected to the output terminals of the first matrix device 101, and receiving units of the display-side digital-image transmission apparatuses 1021 to 1040 are connected to the display devices D1 to D20.

In the first matrix transmission system, a control unit 91c of the first matrix device 101 communicates with all of the digital-image transmission apparatuses 901 to 940.

Thus, the user may be provided with the diagnosis results of the digital-image transmission apparatuses 1001 to 1040 and controls the operations of the digital-image transmission apparatuses 1001 to 1040 on the screen of the GUI of the first matrix device 101.

Likewise, in the second matrix transmission system, host-side digital-image transmission apparatuses 1041 to 1060 are connected between host devices H21 to H40 and input terminals of the second matrix device 103. That is, transmitting units of the host-side digital-image transmission apparatuses 1041 to 1060 are connected to the host devices H21 to H40, and receiving units of the host-side digital-image transmission apparatuses 1041 to 1060 are connected to the input terminals of the second matrix device 103.

Display-side digital-image transmission apparatuses 1061 to 1080 are connected between output terminals of the second matrix device 103 and display devices D21 to D40. That is, transmitting units of the display-side digital-image transmission apparatuses 1061 to 1080 are connected to the output terminals of the second matrix device 103, and receiving units of the display-side digital-image transmission apparatuses 1061 to 1080 are connected to the display devices D21 to D40.

In the foregoing second matrix transmission system, the control unit 103c of the second matrix device 103 communicates with the digital-image transmission apparatuses 1041 to 1080. Thus, the user may be provided with diagnosis results of the digital-image transmission apparatuses 1041 to 1080 and control the operations of the digital-image transmission apparatuses 1041 to 1080 on the screen of the GUI of the second matrix device 103.

Moreover, the control unit 101c of the first matrix device 101 communicates with the control unit 103c of the second matrix device 103 through the ISDN 102.

Thus, the user may be provided with diagnosis results of the digital-image transmission apparatuses 1041 to 1080 of the second matrix transmission system and control the operations of the digital-image transmission apparatuses 1041 to 1080 on the screen of the GUI of the first matrix device 101.

Likewise, the user may be provided with diagnosis results of the digital-image transmission apparatuses 1001 to 1040 of the first matrix transmitting system and control the operations of the digital-image transmission apparatuses 1001 to 1040 on the screen of the GUI of the second matrix device 103.

If a separate control computer is connected to the ISDN 102, the user may be provided with the diagnosis results of the digital-image transmission apparatuses 1001 to 1080 of the first matrix system and the second matrix system on the screen of the GUI of the control computer and control the operations of the digital-image transmission apparatuses 1001 to 1080.

As described above, with the digital-image transmission apparatus according to the one or more of the above embodiments of the present invention, the host-side additional-communication control unit of the transmitting unit performs communication with an external device to diagnose the operation state of the transmitting unit, transmit the diagnosis result to the external device, and control the operation of the transmitting unit.

Thus, the user's computer or terminal may communicate with the host-side additional-communication control unit. Hence, the user may diagnose the operation state of the transmitting unit and control the operation of the transmitting unit. As a simple example for controlling the operation of the transmitting unit, transmission of digital image data may be stopped or resumed when necessary.

Furthermore, the display-side additional-communication control unit of the receiving unit performs communication with the external device to diagnose the operation state of the receiving unit, transmit the diagnosis result to the external device, and control the operation of the receiving unit.

Therefore, the user's computer or terminal communicates with the display-side additional-communication control unit. Thus, the user diagnoses the operation state of the receiving unit and controls the operation of the receiving unit. As a simple example for controlling the operation of the receiving unit, reception of the digital image data may be stopped or resumed.

Furthermore, if the optical cable is connected between the transmitting unit and the receiving unit, the host-side additional-communication control unit is provided with the diagnosis result of the receiving unit and controls the operation of the receiving unit, while performing mutual communication with the display-side additional-communication control unit through the optical cable.

Thus, the user situated in the position of the host device is provided with the diagnosis result of the receiving unit located in a remote place and controls the operation of the receiving unit through the host-side additional-communication control unit.

In addition, the display-side additional-communication control unit is provided with the diagnosis result of the transmitting unit and controls the operation of the transmitting unit, while performing mutual communication with the host-side additional-communication control unit through the optical cable.

Thus, the user situated in the position of the display device is provided with the diagnosis result of the transmitting unit located in the remote place and controls the operation of the transmitting unit.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

INDUSTRIAL APPLICABILITY

The present invention may be used for transmission of digital data as well as digital images.

The invention claimed is:

1. A digital-image transmission apparatus comprising:
a transmitting unit connected to a host device; and
a receiving unit connected to a display device,
wherein the transmitting unit comprises a host-side additional-communication control unit that controls additional communication for digital-image transmission,
the host-side additional-communication control unit performs communication with an external device to diagnose an operation state of the transmitting unit, transmit a diagnosis result to the external device, and control an operation of the transmitting unit,
wherein the host-side additional-communication control unit comprises a host-side microcomputer, an HDMI additional-signal processing unit, a DVI additional-signal processing unit, a DP additional-signal processing unit, an additional-signal selecting unit, a multiplexer/demultiplexer, a parallel-to-serial converting unit, and a serial-to-parallel converting unit;
the host-side microcomputer comprises at least a first serial communication interface and a second serial communication interface and performs communication with an external device through the first serial communication interface to diagnose the operation state of the transmitting unit, transmit the diagnosis result to the external device, and control the operation of the transmitting unit;
the HDMI additional-signal processing unit inputs an additional signal in an HDMI form, which is input from the host device through an HDMI transmission and reception line, to the additional-signal selecting unit through a transmission line, and inputs an additional signal in an HDMI form, which is input from the additional-signal selecting unit through a reception line, to the host device through the HDMI transmission and reception line;
the DVI additional-signal processing unit inputs an additional signal in a DVI form, which is input from the host device through a DVI transmission and reception line, to the additional-signal selecting unit through a transmission line, and inputs an additional signal in a DVI form, which is input from the additional-signal selecting unit through a reception line, to the host device through the DVI transmission and reception line;

the DP additional-signal processing unit inputs an additional signal in a DP form, which is input from the host device through a DP transmission and reception line, to the additional-signal selecting unit through a transmission line, and inputs an additional signal in a DP form, which is input from the additional-signal selecting unit through a reception line, to the host device through the DP transmission and reception line;

the additional-signal selecting unit inputs an additional signal from any one selected from among the HDMI additional-signal processing unit, the DVI additional-signal processing unit, and the DP additional-signal processing unit according to a selection command signal from the host-side microcomputer to the multiplexer/demultiplexer, and inputs an additional signal from the multiplexer/demultiplexer to the selected any one additional-signal processing unit;

the multiplexer/demultiplexer performs multiplexing with respect to the additional signal from the additional-signal selecting unit and a transmitting signal for external communication from the host-side microcomputer to generate a mixed transmitting signal and inputs the generated mixed transmitting signal to the parallel-to-serial converting unit;

the multiplexer/demultiplexer extracts an additional signal and a receiving signal for external communication from a mixed receiving signal from the serial-to-parallel converting unit, inputs the extracted additional signal to the additional-signal selecting unit, and inputs the extracted receiving signal for external communication to the host-side microcomputer, the parallel-to-serial converting unit converts the mixed transmitting signal from the multiplexer/demultiplexer into a serial signal and transmits the serial signal to the receiving unit; and the serial-to-parallel converting unit converts the mixed receiving unit from the receiving unit into a parallel signal and inputs the parallel signal to the multiplexer/demultiplexer.

2. A digital-image transmission apparatus comprising:
a transmitting unit connected to a host device; and
a receiving unit connected to a display device,
wherein the transmitting unit comprises a host-side additional-communication control unit that controls additional communication for digital-image transmission,
the host-side additional-communication control unit performs communication with an external device to diagnose an operation state of the transmitting unit, transmit a diagnosis result to the external device, and control an operation of the transmitting unit,
wherein the receiving unit comprises a display-side additional-communication control unit that controls the additional communication for the digital-image transmission,
the display-side additional-communication control unit performs communication with the external device to diagnose an operation state of the receiving unit, transmit a diagnosis result to the external device, and control an operation of the receiving unit,
wherein the display-side additional-communication control unit comprises a display-side microcomputer, a serial-to-parallel converting unit, a parallel-to-serial converting unit, a demultiplexer/multiplexer, an additional-signal selecting unit, an HDMI additional-signal processing unit, a DVI additional-signal processing unit, and a DP additional-signal processing unit;

the display-side microcomputer comprises at least a first serial communication interface and a second serial communication interface and performs communication with the external device through the first serial communication interface to diagnose an operation state of the receiving unit, transmit a diagnosis result to the external device, and control an operation of the receiving unit;

the serial-to-parallel converting unit converts a mixed receiving signal from the host-side additional-communication control unit into a parallel signal and inputs the parallel signal to the demultiplexer/multiplexer;

the parallel-to-serial converting unit converts a mixed transmitting signal from the demultiplexer/multiplexer into a serial signal and transmits the serial signal to the host-side additional-communication control unit;

the demultiplexer/multiplexer extracts the mixed receiving signal from the serial-to-parallel converting unit, inputs the extracted additional signal to the additional-signal selecting unit, and inputs the extracted receiving signal for external communication to the display-side microcomputer;

the demultiplexer/multiplexer performs multiplexing with respect to an additional signal from the additional-signal selecting unit and a transmitting signal for external communication from the display-side microcomputer to generate a mixed transmitting signal and inputs the mixed transmitting signal to the parallel-to-serial converting unit;

the additional-signal selecting unit inputs an additional signal from any one selected from among the HDMI additional-signal processing unit, the DVI additional-signal processing unit, and the DP additional-signal processing unit according to a selection command signal from the display-side microcomputer to the demultiplexer/multiplexer and inputs an additional signal from the demultiplexer/multiplexer to the selected any one additional-signal processing unit;

the HDMI additional-signal processing unit inputs an additional signal in an HDMI form, which is input from the additional-signal selecting unit through a reception line, to the display device through the HDMI transmission and reception line and inputs an additional signal in an HDMI form, which is input from the display device through the HDMI transmission and reception line, to the additional-signal selecting unit through a transmission line;

the DVI additional-signal processing unit inputs an additional signal in a DVI form, which is input from the additional-signal selecting unit through a reception line, to the display device through the DVI transmission and reception line, and inputs an additional signal in the DVI form, which is input from the display device through the DVI transmission and reception line, to the additional-signal selecting unit through a transmission line; and the DP additional-signal processing unit inputs an additional signal in a DP form, which is input from the additional-signal selecting unit through a reception line, to the display device through a DP transmission and reception line, and inputs an additional signal in the DP form, which is input from the display device through the DP transmission and reception line, to the additional-signal selecting unit through a transmission line.

* * * * *